(No Model.) 2 Sheets—Sheet 1.
J. M. CHANEY.
PLANETARIUM.
No. 573,137. Patented Dec. 15, 1896.
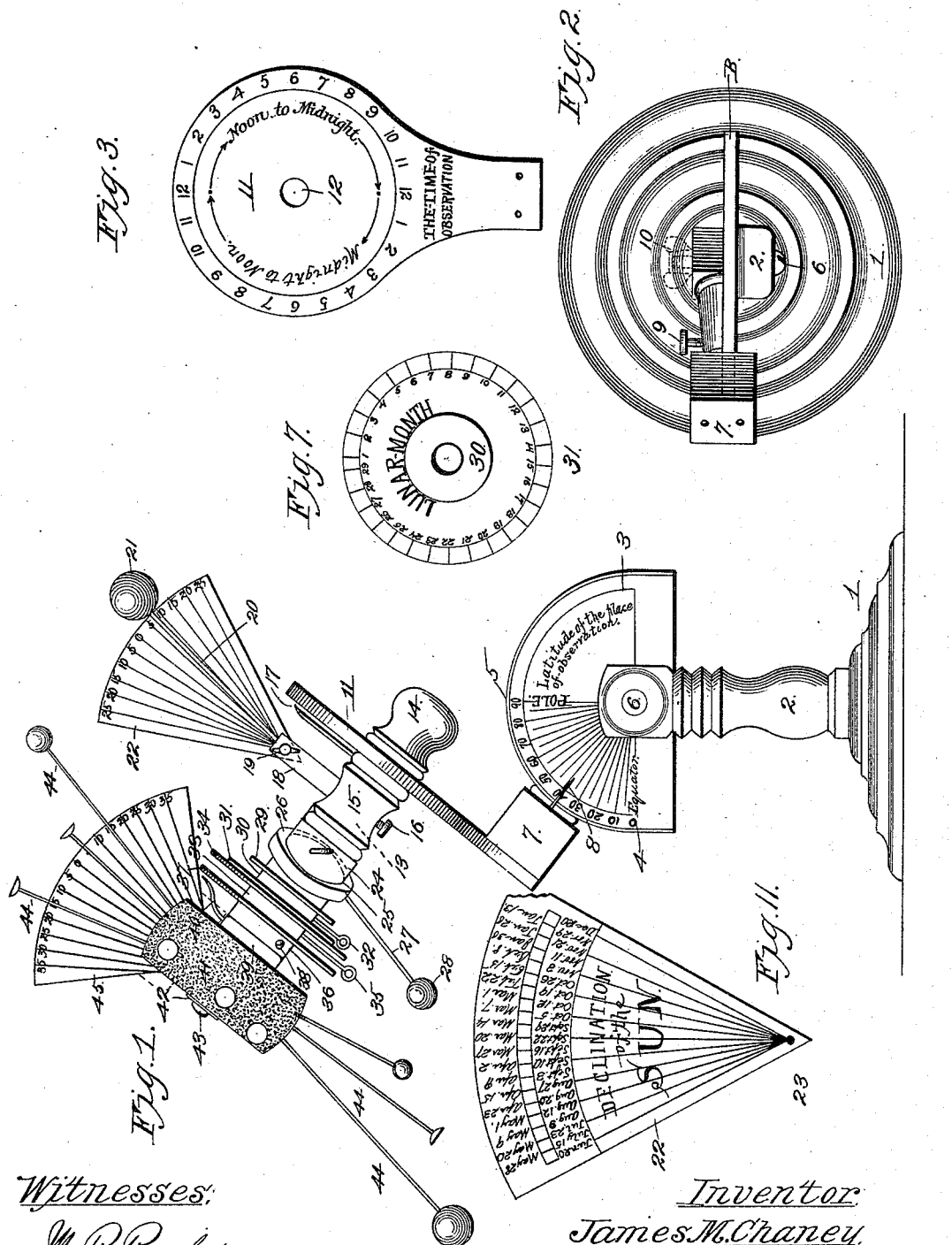
Witnesses:
M. R. Remley
G. J. Thorpe
Inventor
James M. Chaney
by Hipson & Hipson
attys.

(No Model.) 2 Sheets—Sheet 2.
J. M. CHANEY.
PLANETARIUM.
No. 573,137. Patented Dec. 15, 1896.
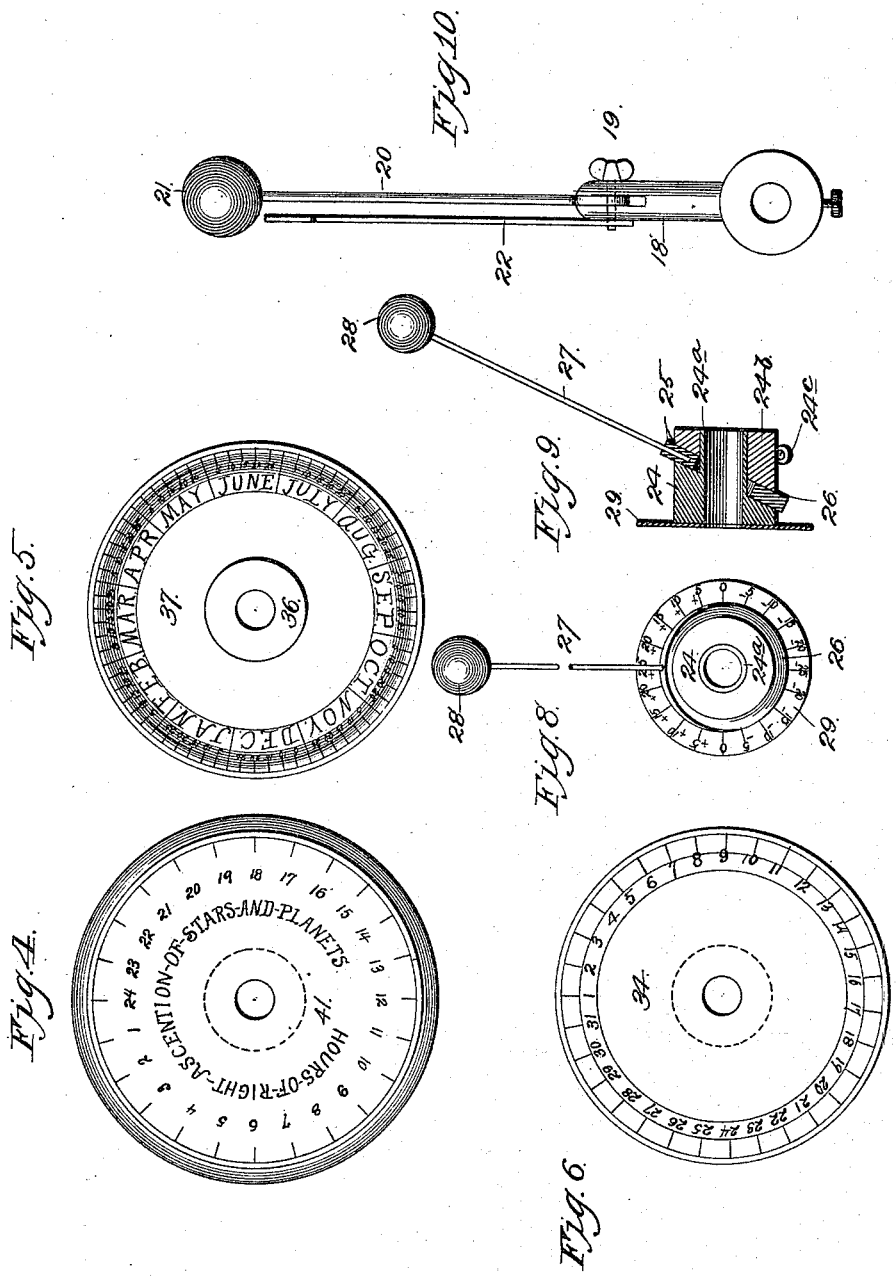
Witnesses:
M. R. Remley
G. J. Thorpe
Inventor:
James M. Chaney
by Hipman & Hipman
attys.

12
UNITED STATES PATENT OFFICE.

JAMES M. CHANEY, OF INDEPENDENCE, MISSOURI.

PLANETARIUM.

SPECIFICATION forming part of Letters Patent No. 573,137, dated December 15, 1896.

Application filed February 3, 1896. Serial No. 577,785. (No model.)

*To all whom it may concern:*

Be it known that I, JAMES M. CHANEY, of Independence, Jackson county, Missouri, have invented certain new and useful Improvements in Planetariums, of which the following is a full, clear, and exact description, reference being had to the accompanying drawings, forming a part thereof.

My invention relates to educational appliances, and more particularly to a new and improved orrery or planetarium, whereby at a glance may be ascertained the location of the sun, moon, planets, stars, constellations, &c., at any time or place with any point on the earth as the base of observation.

Previous to my invention it was practically impossible within an ordinary school-term to give a student a comprehensive idea of astronomy without the use of very expensive and elaborate apparatus, such as is possessed by comparatively few of the educational institutions of the world.

The first object of my invention, therefore, is to produce a planetarium to be used as a means for quickly and easily pointing out or indicating various heavenly bodies, which any person of ordinary intelligence, by following a written guide, or after a short preliminary instruction as to the object and *modus operandi* of the device may properly operate it to their great interest and advantage, and, secondly, to produce a planetarium at a cost within the reach of any school or person.

With these objects in view the invention consists in certain novel and peculiar features of construction and organization of parts, as will be hereinafter described and claimed.

In order that the invention may be fully understood, I will proceed to describe it with reference to the accompanying drawings, in which—

Figure 1 represents a side view of my improved planetarium. Fig. 2 is a plan view of the lower portion of the same. Fig. 3 is a face view of the table upon which are inscribed the hours from midnight to noon and from noon to midnight. Fig. 4 is a face view of the globe or disk which represents the earth in the planetarium. Fig. 5 is a face view of the year-disk. Fig. 6 is a face view of the calendar-month disk. Fig. 7 is a face view of the lunar-month disk. Fig. 8 is a face view of the moon-carrying collar and declination-disk. Fig. 9 is a central section of the same. Fig. 10 is a view of the sun-carrying mechanism and of the declination-guide therefor arranged in operative relation to the same. Fig. 11 is a face view of such declination-guide.

In the said drawings, where similar numerals refer to corresponding parts in the several figures, 1 designates the base of the structure, 2 the vertical standard which projects upwardly from the center of the same, and 3 a semicircular plate on which is inscribed a quadrant divided into degrees from the equator (designated by the numeral 4) to the pole, (designated by the numeral 5,) the axis of said quadrant coinciding with the axis of the screw 6 or other suitable device for securing the plate 3 to the standard 2 in a reliable manner, and pivotally mounted upon said screw or pivot 6 at the rear side of the plate is an arm 7, provided with an offset, from which projects radially over the face of the quadrant an index-finger or pointer 8, so that by properly adjusting said arm the pointer may be made to indicate the latitude of any place on the earth.

After the arm has been adjusted as required it is fixed in such position by means of the set-screw 9, carried by said arm to impinge upon the back of the plate 3, or a clamping-nut 10, engaging the threaded end of the screw 6, may be employed in lieu thereof, as the precise means for setting said arm at the required point of colatitude is immaterial, provided it accomplish the object in view. Fastened securely to the outer end of the arm 7 and projecting at right angles therefrom is a table 11, on which is inscribed the twenty-four hours of the day, which table will be hereinafter termed the "hour-disk." Journaled axially of and rotatably in said hour-disk, so as to extend parallel with the radial index-finger or pointer 8 at all times, is a shaft 13, and secured to or formed integrally on its lower end, or that end which projects at the rear side of the hour-disk, is a knob or handle 14, by which said shaft may be rotatably adjusted when necessary. Mounted upon the shaft at the opposite side of said disk is a collar 15, which may be made fast upon said shaft by a set-screw 16 or equivalent means, and 17 is a hand or pointer which projects radially from said collar and is adapted to indicate any hour of the day or night by reference to the hour-disk. 18 designates a standard or post which projects perpendicularly and radially from said collar in the same vertical plane as the hand or pointer 17 and is bifurcated at its outer end, and 19 designates a clamping-screw which extends through said bifurcated outer end and also through the eye or opening formed in the lower end of the rod 20, which occupies said bifurcation, so that by manipulating said clamping-screw the opposing arms formed by bifurcating the post may be caused to exert more or less friction upon the interposed rod and thereby hold the same at any angle desired to the post 18, or, in other words, at any declination desired with relation to its axis, which is coincident with the clamping-screw 19. This rod carries at its outer end a ball 21, representing the sun.

To form a guide in setting the sun for declination, I provide an arc of about forty-seven degrees in the form of a plate 22, and this plate at a point coincident with the axis of such arc is provided with a hole or aperture 23. The degrees upon this arc may be indicated by numerals, as in Fig. 1, or in lieu of such numerals will be inscribed the dates which identify the position or declination of the sun on such date; or, in other words, on March 20, which is the date of the vernal equinox, the sun is perpendicular to its axis or is crossing the equator, which is represented by "0" on the guide illustrated in Fig. 1. To set the sun at the required point, the opening 23 of the guide is fitted upon the projecting ends of the clamping-screw 19 and is then adjusted until the degree marked "0" or "March 20" is perpendicular to the axis of the shaft, as shown in Fig. 1. To set the sun for this date, March 20, it is now adjusted until its pin 20 extends coincidently with such perpendicular degree marked on the guide, and it is secured in such position, as above explained, by properly manipulating the clamping-screws.

For a further example, supposing we wish to set the sun to its proper declination for April 15, all that is necessary after placing the guide in its proper position relative to the axis of the sun-carrying rod, as above explained, is to adjust the sun-carrying rod until it coincides with the radial line leading from the axis of the guide to the date April 15. This may be done, of course, without knowing what such angle of declination really is. Therefore a person entirely ignorant of the sun's declination on such date as regards degrees may set it at its proper declination for such date without consulting a table or nautical almanac. In case the guide illustrated in Fig. 1 is employed it is first necessary to consult a table or almanac to ascertain the declination for a given date and then to adjust the sun-carrying rod to such degree. It is obvious, therefore, that by providing the guide with the dates the declination of the sun may be ascertained by any one using the planetarium without necessitating the outside assistance of a table or almanac.

Mounted upon the shaft 13, above the collar 15, is a second collar 24, provided with an annular groove 25, arranged at an angle of about fifty-seven degrees relative to the axis of the shaft. Such collar may be integrally formed or may consist of a section provided with a tubular extension $24^a$, and a second section $24^b$, which is secured by the set-screw $24^c$ upon such tubular extension, as shown in Fig. 9, and this set-screw may also be employed for securing said collar at any desired point of adjustment rigidly upon the shaft. Rotatably mounted in the groove 25 is a sleeve or ring 26, and projecting from said ring or annulus and at the same degree of obliquity to the axis of the shaft and also radially of the same is a rod 27, carrying a ball 28 at its outer end representing the moon, which from this construction obviously may be revolved around said collar, the ring or annulus being arranged within said groove with sufficient frictional contact to hold the moon at any desired point of its adjustment.

29 designates what I term the "declination-disk," and is secured in any suitable manner rigidly to the upper or outer end of the collar 24, and has inscribed thereon the ascending and descending degrees of the north and south declination of the moon. Next above said disk and also mounted rotatably upon said shaft is a collar 30, which carries what I term the "lunar-month disk" 31, and 32 designates a set-screw whereby the same may be fixed at any desired point of adjustment upon the shaft. Adjacent to said disk is the collar 33, carrying at its lower end the calendar-month disk 34, which is of greater diameter than the lunar-month disk 31 in order that said disks may be adjusted with reference to each other, as hereinafter more particularly referred to, and 35 designates a set-screw by which said collar 33 may be fixed at any desired point of adjustment. 36 designates another collar, which is rotatably mounted upon said shaft, and 37 a disk carried thereby, which I term the "year-disk," and upon which is inscribed the twelve months of the year, and each month is subdivided into periods of about five days each. 39 designates still another collar, mounted rotatably upon said shaft, and 40 an index finger or pointer, which projects from said collar and is adapted to indicate by reference to such year-disk the day of the month upon which the observation is made, said collar 39 carrying also a globe or disk 41, preferably of felt or equivalent material, which is intended to represent a sphere, said disk being the central or equatorial part of the same and of suitable width to include several degrees north and south of the equator. Suitable means are also provided for fixing the collar 39 rigidly at any required point of its rotation upon the shaft 13. On the front face of said disk are inscribed the twenty-four hours of right ascension, and such hours will be subdivided, as indicated. This disk is held from accidental displacement upon the shaft by means of a washer 42 upon the outer end of the shaft and by means of a headed screw 43, which extends axially into the shaft and bears against said washer, which screw represents the pole-star, as, when the device is properly arranged for operation, this screw indicates properly the location of the pole-star in the heavens. 44 designates pins stuck radially into said disk 41, and carried at their outer ends are disks or balls which represent the various planets and stars of the first magnitude. Said pins are arranged relative to said sphere or disk in the manner hereinafter described by means of a quadrant-shaped guide 45, which is graduated to a number of degrees each side of its center or equatorial line. This guide is bifurcated at its inner end, so that when fitting snugly or radially upon the disk 41 its central or zero degree-line will extend perpendicular to the center of the disk, as indicated in Fig. 1.

In placing a star or a planet in its proper position, say at 13, as regards right ascension and declination, it will be found most convenient to remove the disk representing the earth from the shaft and then to slip over the same (if not already in place) the guide 45, being careful that the zero of the declination-guide is perpendicular to the surface of the circumference of the disk and that the plane of the guide corresponds with the plane at right ascension of said planet or star at the time of the observation, (in this case with the number 13 upon the face of the disk,) which is ascertained from a suitable table or nautical almanac. The degree of declination being known, all that is necessary now is to stick the pin radially into the disk and at the exact inclination indicated by the radial degree-mark of the guide, which may then be removed. The disk is now revolved upon the shaft until the pointer 40 is opposite the day of observation on the year-disk, which disk should be adjusted rotatably until March 20 (the date of the vernal equinox) is in the same plane and at the same side of the shaft 13 as the sun-carrying rod. To set the moon, (supposing the new moon occurred on the 14th day of January,) loosen the calendar-month disk and revolve it until the date of the new moon is in alinement with the sun-carrying rod at the same side of the shaft 13, at which point it should be fastened. The lunar-month disk is then adjusted to correspond—that is, until the "14th of January," as represented on the lunar-month disk, is in radial alinement with the "14" of the calendar-disk. Now to arrange for declination loosen the collar 24 and rotate it until the ascending or descending declination north or south of the declination-disk, as ascertained from the nautical almanac or other reliable source, is opposite the date ("14") of the new moon. Then fasten said collar and move the oblique moon-carrying ring around to the date of observation, as indicated on the lunar-disk. The adjustment from day to day by the lunar-disk is necessary because the full moon is about fourteen and three-fourths days from the first of the lunar month, which is just about one-half the same, or when represented by a circular disk just half-way around it, owing to the fact that the full moon must be directly opposite the sun, while if adjusted from day to day by the calendar-month disk in fourteen and three-fourths days the moon would not be half-way around the disk, and therefore would not be directly opposite the sun, its proper position approximately at such time. The adjustment of the moon-carrying ring in this manner, owing to the obliquity of the same, varies constantly and indicates, approximately, the declination of the moon. The right ascension and declination of the sun, moon, planets, and stars being now found, it is necessary by grasping the knob 14 to turn the shaft until the hand or finger 17 indicates the hour (either day or night) of observation, and then after the finger 8 is adjusted to indicate the colatitude of place of observation, to place the planetarium upon a level support, with the disk which represents the earth facing to the north. In such position the planetarium representations of the sun, moon, planets, stars, constellations, and other heavenly bodies correctly indicate the positions of their originals in the heavens.

While I have described and illustrated the earth-disk as movable relative to the sun, it is to be understood that this arrangement may be reversed by moving the sun backward with relation to the earth-disk, as fixed, or the sun may be held immovable by the hand, while the shaft may be rotated to adjust the earth-disk without loosening the same to set it relative to the sun, and the object in view is accomplished. When so constructed, I can most conveniently dispense with an independent year-disk and in lieu thereof have the same engraved or printed upon the stationary table or hour-disk and have the pointer 40 arranged adjacent to it instead of in the position shown. It is also obvious that the various disks and parts may be arranged in other positions relative to each other on the shaft, and I wish it understood that I reserve the right to make any and all changes which do not involve a departure from the spirit and scope of my invention.

From the above description, taken in connection with the accompanying drawings, it is apparent that I have produced a planetarium whereby an observer on the earth can readily locate the various planets, stars, constellations, sun, &c., at any time and place, which is simple, durable, and inexpensive of manufacture.

Having thus described the invention, what I claim as new, and desire to secure by Letters Patent, is—

1. A planetarium, comprising a standard, a quadrant thereon, a shaft coupled to said standard, a collar thereon, and adapted to be set to an angle to the horizon corresponding to the latitude of the place of observation, and a representation of the sun arranged to turn with said collar and adjustable in a plane at right angles to its rotatable movement, for the purpose set forth.

2. A planetarium, comprising a standard, a quadrant thereon, a shaft coupled to the standard, a collar thereon and adapted to be set at an angle to the horizon corresponding to the latitude of the place of observation, a representation of the sun arranged to turn with said collar, and adjustable in a plane at right angles to its rotatable movement, and a guide arranged adjacent in a certain relation to said representation of the sun, whereby the latter may be quickly set to its proper declination, substantially as set forth.

3. A planetarium, comprising a standard, a quadrant thereon, a shaft coupled to the standard, a collar thereon and adapted to be set at an angle to the horizon corresponding to the latitude of the place of observation, a rod pivotally supported by an arm of said collar, a ball or enlargement secured to said arm to represent the sun, and means to clamp said arm at any desired point in its adjustment, substantially as described.

4. A planetarium, comprising a standard, a quadrant thereon, a shaft coupled to the same, a collar thereon adapted to be set at an angle to the horizon corresponding to the latitude of the place of observation, and provided with a bifurcated arm, a clamping-screw extending through the bifurcated end of said arm, a rod pivoted to said screw within said bifurcation so that it may be adjusted in a plane radial of the axis of the collar, and a ball, or representation of the sun, secured to the outer end of said rod.

5. A planetarium, comprising a standard, a quadrant thereon, a shaft coupled to the standard, a collar thereon adapted to be set at an angle to the horizon corresponding to the latitude of the place of observation, a graduated disk or table arranged at right angles to the axis of said collar, and a representation of the sun arranged to turn with said collar and adjustable relative to said graduated disk or table, substantially as described.

6. A planetarium, comprising a standard, a quadrant thereon, a shaft coupled to the standard, a collar thereon adapted to be set at an angle to the horizon corresponding to the latitude of the place of observation, and provided with an arm, and with an index-finger in the same longitudinal plane relative to the axis of the collar, a rod pivoted to said arm to swing in said plane, and provided with a ball at its opposite end to rotate the sun, and a graduated disk arranged at right angles to the axis of said collar, and adjacent to said index-finger, substantially as and for the purpose set forth.

7. A planetarium, having a base provided with a graduation indicating the degrees of latitude, a shaft supported from said base and a revoluble collar arranged at an angle to the horizon corresponding to the latitude of the place of observation, as represented by said graduation, and a representation of the sun arranged to turn with said collar, and adjustable in a plane at right angles to its rotatable movement to get its proper declination at any given place, substantially as described.

8. A planetarium, having a base provided with a graduation indicating the degrees of latitude, a shaft supported from said base and a revoluble collar arranged at an angle to the horizon corresponding to the latitude of the place of observation, as represented by said graduation, a representation of the sun arranged to turn with said collar, and adjustable in a plane at right angles to its rotatable movement, to get its proper declination at any desired place, and a disk provided with graduations from noon to midnight and from midnight to noon, whereby the sun may be set to its proper declination at any given time and place, substantially as described.

9. A planetarium, comprising a standard, a quadrant thereon, a shaft coupled to the standard, a collar thereon and adapted to be set to an angle to the horizon corresponding to the latitude of the place of observation, and provided with an obliquely-arranged groove, and a moon-carrying ring or annulus adjustably mounted in said groove, substantially as and for the purpose set forth.

10. A planetarium, comprising a base, a standard, a quadrant, an arm arranged radially of said quadrant and provided with a shaft adapted to be set to an angle to the horizon corresponding to the latitude of the place of observation, a rotatable collar thereon, provided circumferentially with an annular groove arranged at the required obliquity, a rod projecting from said ring and provided with a ball or enlargement to represent the moon, and means to fix the revoluble collar upon said shaft, at any required point in its adjustment, substantially as described.

11. A planetarium, comprising a base, a standard, a quadrant, an arm arranged radially of said quadrant, and provided with a shaft set to an angle to the horizon corresponding to the latitude of the place of observation, a rotatable collar thereon having a circumferential and obliquely-arranged groove, a ring adjustable within said groove and carrying a representation of the sun, a graduated or declination disk secured to said rotatable collar, and a graduated or lunar-month disk arranged adjacent thereto, whereby the orbit of the moon may be traced day by day, substantially as described.

12. A planetarium, provided with a shaft set to the angle corresponding to the colatitude of the place of observation, a rotatable collar thereon having a circumferential and obliquely-arranged groove, a ring adjustable within said groove and carrying a representation of the moon, a graduated or declination disk secured to said rotatable collar, a graduated or lunar-month disk arranged adjacent thereto, and a graduated or calendar-month disk arranged adjacent to the lunar-month disk, substantially as and for the purpose described.

13. A planetarium, comprising a standard, a quadrant thereon, a shaft coupled to the standard, a collar thereon, and set to an angle to the horizon corresponding to the latitude of the place of observation and provided circumferentially with an obliquely-arranged groove, a ring adjustably mounted in said groove and carrying a representation of the moon, in combination with a sphere or disk rotatable on the same axis as said collar and representing the earth, and means to adjust said collar and said ring, in order to place the moon in its proper position relative to the earth at any given time, substantially as described.

14. A planetarium, comprising a standard, a quadrant thereon, a shaft coupled to the standard, a collar thereon and set to an angle to the horizon corresponding to the latitude of the place of observation and carrying a representation of the moon which is adjustable in a plane extending longitudinally of the axis of the said collar, a sphere or disk rotatable upon the same axis as said collar, and a guide arranged adjacent to the representation of the sun, whereby the latter may be set to its proper declination or position relative to the earth at any given time, substantially as described.

15. A planetarium, comprising a horizontal base, a vertical standard projecting therefrom, a plate secured vertically to said standard and provided on its face with the graduated quadrant representing degrees from the equator to the pole, an arm pivoted coincidently with the axis of said quadrant and provided with an index-finger extending radially and adjacent to the face of said quadrant, a table or hour-disk secured to and extending at right angles from said pivoted arm, a shaft journaled in said disk or table and extending parallel to said arm, a collar revolubly mounted upon said shaft and provided with an index-finger adjacent to said hour-disk, and provided with a sun-carrying rod which is adjustable longitudinally of said shaft and extending radially of its axis, a second revoluble collar mounted upon said shaft, an obliquely-arranged ring rotating upon the same and carrying the moon, a sphere or disk rotatably mounted upon said shaft, which represents the earth, headed pins carried by and extending radially of said globe or disk to indicate the location of the various planets and stars, and means to set the sun and moon at their proper declinations at any given time and place, whereby their positions relative to the earth may be ascertained, substantially as described.

In testimony whereof I affix my signature in presence of two witnesses.

JAMES M. CHANEY.

Witnesses:
M. R. REMLEY,
G. Y. THORPE.